Figure 1:
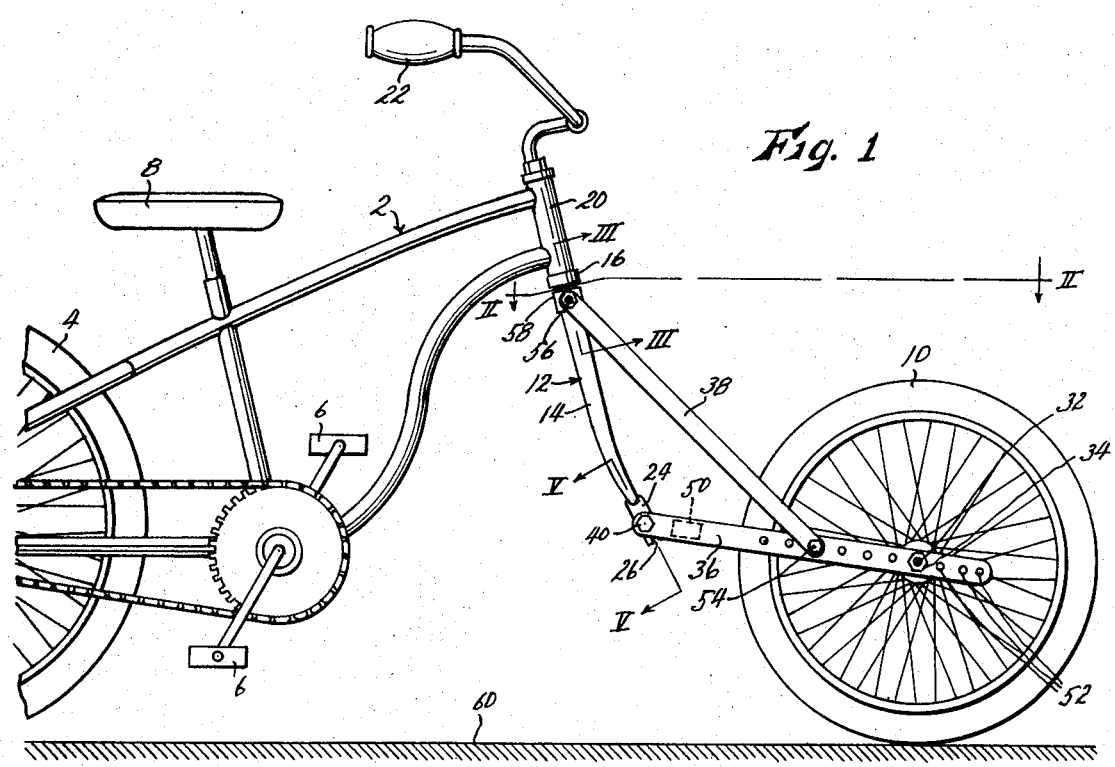

United States Patent
Siebers

[15] 3,694,004
[45] Sept. 26, 1972

[54] FRONT WHEEL MOUNTING FOR BICYCLES

[72] Inventor: Aloysius F. Siebers, 7632 Robinson St., Overland Park, Kans. 66204

[22] Filed: Nov. 18, 1970

[21] Appl. No.: 90,561

[52] U.S. Cl. ................................................280/277
[51] Int. Cl. .............................................B62k 25/16
[58] Field of Search..........280/277, 278, 279, 43, 78, 280/286, 275

[56] References Cited

UNITED STATES PATENTS

| | | |
|---|---|---|
| 444,639 | 1/1891 | O'Neill ......................280/277 |
| 2,596,411 | 5/1952 | Jordan........................280/276 |
| 3,477,741 | 11/1969 | Ross............................280/279 |
| 461,001 | 10/1891 | Thompson.................280/277 |
| 974,365 | 11/1910 | Draper....................280/277 X |
| 801,741 | 10/1905 | McIntyre...................280/277 |
| 3,090,638 | 5/1963 | Somhegyi ..............280/277 X |

FOREIGN PATENTS OR APPLICATIONS 514,823  11/1920  France......................280/277

Primary Examiner—Kenneth H. Betts
Attorney—John A. Hamilton

[57] ABSTRACT

A front wheel mounting for bicycles consisting of a pair of arms adapted to be pivoted at their rearward ends to lower ends of the usual fork legs of the bicycle for vertical pivotal movement, the front cycle wheel being rotatably mounted between said arms at selective points along the lengths thereof, and a pair of angled struts each pivoted at its lower end to one of said arms at selective points along the length thereof, and at its upper end to the associated fork leg in spaced relation above the connection of said arm thereto, said struts being resiliently yieldable in compression whereby to provide a spring mounting for said front cycle wheel.

3 Claims, 6 Drawing Figures

PATENTED SEP 26 1972

3,694,004

INVENTOR.
Aloysius F. Siebers
BY
John A. Hamilton
Attorney.

FRONT WHEEL MOUNTING FOR BICYCLES

This invention relates to new and useful improvements in front wheel mountings for bicycles, and has as an important object the provision of a wheel mounting which permits the front cycle wheel to be positioned at exaggerated and variable distances forwardly of its usual position at the steering axis of the front fork of the cycle. For reasons best known to themselves, perhaps because it causes the cycle to resemble in some degree a drag racing automobile, youthful bicycle riders often desire this arrangement.

Another object is the provision of a front wheel mounting of the character described which permits the use of a front wheel of a size different than that for which the bicycle was originally designed, and includes means for levelling the bicycle in such cases even if the rear cycle wheel is not changed. Perhaps for the same reason given above, many youthful bicycle riders desire a front wheel of reduced size.

A further object is the provision of a front wheel mounting of the character described which provides a vertically yieldable spring mounting for the front cycle wheel, thereby increasing the riding comfort of the vehicle.

Other objects are simplicity and economy of construction, efficiency and dependability of operation, and adaptability to be made and sold as a kit for nearly any pre-existing bicycle requiring no structural alteration of any kind in the frame or fork of the bicycle and being attachable thereto by ordinary hand tools.

Figure 2:
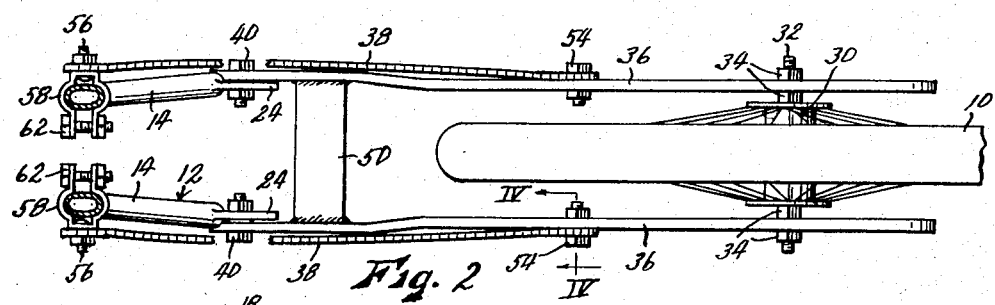
Figure 3:
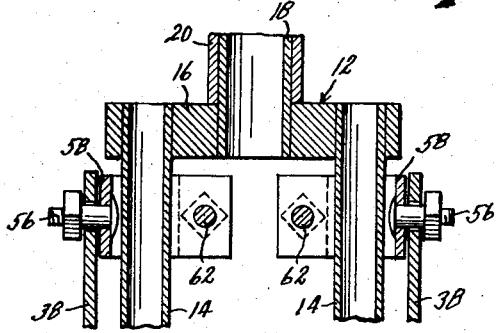
Figure 4:
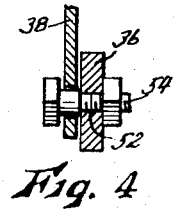
Figure 5:
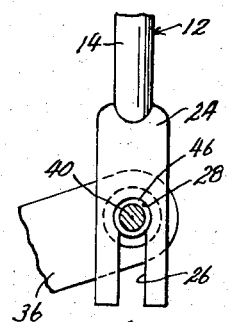
Figure 6:
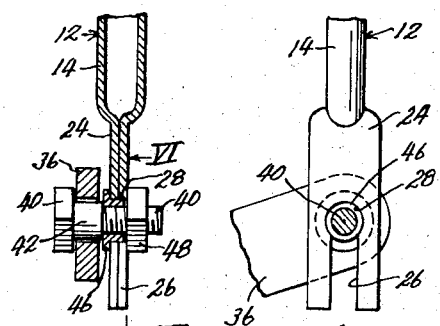

With these objects in view as well as other objects which will appear in the course of the specification, reference will be had to the accompanying drawing, wherein:

FIG. 1 is a fragmentary side elevational view of a bicycle, including a front wheel mounting embodying the present invention, FIG. 2 is an enlarged, fragmentary sectional view taken on line II—II of FIG. 1, with parts broken away, FIG. 3 is an enlarged, fragmentary sectional view taken on line III—III of FIG. 1, FIG. 4 is an enlarged, fragmentary sectional view taken on line IV—IV of FIG. 2, FIG. 5 is an enlarged, fragmentary sectional view taken on line V—V of FIG. 1, and FIG. 6 is a sectional view taken on line VI—VI of FIG. 5.

Like reference numerals apply to similar parts throughout the several views, and the numeral 2 applies generally to the main frame of a bicycle shown fragmentarily in side elevation in FIG. 1. Said main frame carries a rear wheel 4 for rotation on a horizontal transverse axis and rotatable to drive the vehicle by operation of a pair of foot pedals 6 by a rider sitting on seat 8, in the usual manner well known in the art. The front wheel 10, normally coplanar with rear wheel 4, will in the use of the present mounting normally be of smaller diameter than said rear wheel. Said front wheel, in the usual bicycle, is carried directly by the front fork 12 of the bicycle, said fork including a pair of transversely spaced apart legs 14 rigidly affixed at their upper ends in a cross head 16. A spindle 18 (see FIG. 3), generally parallel to legs 14, is fixed centrally in said cross head, and extends upwardly therefrom, being mounted for axial oscillation in a tubular bearing 20 fixed to and forming a portion of frame 2. Said bearing is normally inclined downwardly and forwardly, and the handle bars 22, by which the bicycle is steered, are affixed to the upper end of spindle 18 by any suitable means, not shown. The lower end portions 24 of fork legs 14 are flattened to lie in transversely spaced apart vertical planes, and are slotted upwardly from their lower ends, as at 26, the upper ends of said slots being circularly enlarged, as at 28 (see FIGS. 5 and 6), to a diameter greater than the width of said slot. The slots of the two fork legs are aligned horizontally and transversely of the fork. Front wheel 10 has a hub 30 rotatably mounted on a fixed axle 32 at the extended portions of which are threaded. Ordinarily, the extended end portions of said axle are introduced upwardly into the slots 26 of the fork legs, and fixed therein by a pair of lock nuts 34 threaded thereon respectively at each side of each of the flattened portions 24 of the fork legs.

The front wheel mounting as contemplated by the present invention includes a pair of arms 36 and a pair of struts 38. Each of arms 36 is pivoted at its rearward end to the lower end of one of fork legs 14 by a bolt 40. As best shown in FIG. 5, said bolt has an enlarged shoulder 42 on which arm 36 is pivoted, and a reduced threaded portion 44 on which is slidably mounted a flanged sleeve 46, the external diameter of which fits snugly in enlargement 28 of slot 26, but is too large to move through said slot. Thus nut 48 may be tightened securely to lock the bolt in position, while leaving arm 36 free to pivot vertically. Arms 36 extend forwardly in parallel relation, and are rigidly fixed together adjacent their rearward ends by a cross bar 50 extending transversely therebetween and welded thereto. Front wheel 10 is mounted between the forward end portions of said arms, the extended end portions of axle 32 being engaged selectively in corresponding pairs of a series of holes 52 formed in said arms in longitudinally spaced relation therealong, and secured therein by lock nuts 34. Arms 36 may be spread apart resiliently to a sufficient degree to permit insertion of said axle into said holes.

Each of struts 38 is pivotally connected at its lower end to one of arms 36, intermediate wheel axle 32 and the pivots 40 of said arms, by a bolt 54 inserted selectively in one of holes 52 of said arm, said bolt being shouldered as shown in FIG. 4 whereby it may be drawn securely tight without preventing or impeding relative vertical pivotal movement of said arm and strut. The struts are angled upwardly and rearwardly, and each is pivoted on a shouldered bolt 56 fixed in and extending horizontally and transversely outwardly from a clip 58, said clip being securely clamped on the corresponding leg 14 of fork 12, immediately below cross head 16 of said fork, by clamp bolt 62. Struts 38 are formed of spring steel whereby to constitute leaf springs, and as best shown in FIG. 2 are each preformed to have a normal unstressed curvature transversely outwardly from the midline of the bicycle.

In operation, it will be seen that by engaging wheel axle 32 selectively in various corresponding pairs of holes 52 of arms 36, front wheel 10 may be positioned at different distances forwardly of its usual position at the lower end of fork 12, as may be desired by the rider. Also, wheel 10 may be interchanged for front wheels of other diameters as may be desired, since said wheel is no longer disposed within and bridged by fork 12, and is therefore free of size limitations imposed by said fork on wheels mounted therein in the usual manner. Most commonly, as shown, young bicycle riders prefer a front wheel 10 smaller in diameter than rear wheel 4.

The vertical disposition of front wheel 10 with respect to the bicycle may be adjusted by inserting attaching bolts 54 of the lower ends of struts 38 selectively in various of holes 52 of arms 36. Insertion of said bolts in the more forward of said holes elevates wheel 10, while insertion of said bolts in the more rearward of said holes lowers wheel 10, with respect to the bicycle frame. In this manner the bicycle may be levelled so that frame 2 is disposed normally relative to the ground line 60, despite the fact that the size of the front wheel has been altered. If, as shown, a front wheel smaller than the rear wheel has been substituted, it may be necessary to lower the front wheel by moving bolts 54 rearwardly in order to preserve a safe clearance of pedals 6 above the ground line 60. Of course, some young riders may prefer not to level the frame 2, but to use it with a deliberate and intentional upward or downward tilt toward its forward end. This is also possible with the structure shown.

Also, while the triangular frames comprised by each fork leg 14 and its associated arm 36 and strut 38 would normally be a rigid structure if all of its members were rigid, the fact that strut 38 is longitudinally, resiliently compressible due to its bowed form and being formed of spring material, and that the frame members are pivotally connected at its corners by bolts 40, 54, and 56 respectively, permits wheel 10 to yield upwardly whenever said wheel strikes a bump in ground surface 60. This spring mounting of course contributes to a softer, more comfortable ride. The normal outward curvature of the struts, as shown in FIG. 2, precludes any possibility that they could yield inwardly and pinch wheel 10 therebetween. Arms 36 must not flex appreciably at any time, nor can they be allowed to pivot unequally on bolts 40, since any such movement would cause lateral tilting of the wheel and movement of wheel axle 32 relative to fork 12. This would be a very dangerous condition. For these reasons, arms 36 are formed of bar stock sufficiently heavy and rigid that they will not flex in normal usage, and they are rigidly interconnected by cross bar 50.

Finally, it will be seen that the entire wheel mounting forming the subject matter of this invention, consisting of arms 36, struts 38, clips 58, and the various pivot bolts, may be manufactured and sold conveniently as a kit, and attached to virtually any pre-existing bicycle without necessity of any structural alteration or adaptation whatsoever of the bicycle itself, and by use of only a common wrench for tightening the various bolts and nuts.

While I have shown and described a specific embodiment of my invention, it will be readily apparent that many minor changes of structure and operation could be made without departing from the spirit of the invention.

What I claim as new and desire to protect by Letters Patent is:

1. A front wheel mounting for a bicycle having a front wheel fork including transversely spaced apart, downwardly extending legs between the lower ends of which the front wheel is normally mounted for rotation on a horizontal transverse axis, said wheel mounting comprising:
   a. a pair of arms,
   b. means for connecting the rearward ends of said arms respectively to the lower ends of said fork legs for vertical pivotal movement, said arms extending forwardly,
   c. means for mounting a front wheel between the forwardly extending end portions of said arms for rotation on a horizontal transverse axis, and
   d. support means extending between and interconnecting each of said fork legs and its associated arm to resist vertical pivotal movement of said arm, said support means comprising a pair of elongated support struts each comprising a leaf spring longitudinally resiliently yieldable to reduce the effective length thereof, means for attaching one end of each strut to one leg of said fork for pivotal movement on a horizontal transverse axis in spaced relation above the connection of the associated arm thereto, and means attaching the opposite end of each of said struts to its associated arm for pivotal movement on a horizontal transverse axis, in forwardly spaced relation from the connection of said arm to said fork leg.

2. A wheel mounting as recited in claim 1 in which said struts, though generally parallel, are normally bowed away from each other intermediate their ends.

3. A wheel mounting as recited in claim 1 wherein said arms are sufficiently rigid to resist appreciable flexure thereof in normal usage, and with the addition of a rigid member extending between and rigidly joining said arms adjacent their rearward ends, whereby said arms are prevented from pivoting unequally relative to said fork.

* * * * *